US012706465B2

(12) United States Patent
Bongiorno et al.

(10) Patent No.: US 12,706,465 B2
(45) Date of Patent: Aug. 11, 2026

(54) CONTROL SYSTEM CONFIGURED FOR, AND A METHOD FOR, EMULATING A VIRTUAL SYNCHRONOUS MACHINE OF A GRID-FORMING VOLTAGE SOURCE CONVERTER

(71) Applicant: Hitachi Energy Ltd, Zürich (CH)

(72) Inventors: Massimo Bongiorno, Gothenburg (SE); Jan Svensson, Västerås (SE); Jean-Philippe Hasler, Västerås (SE)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 19/118,901

(22) PCT Filed: Oct. 7, 2022

(86) PCT No.: PCT/EP2022/077951
§ 371 (c)(1),
(2) Date: Apr. 7, 2025

(87) PCT Pub. No.: WO2024/074214
PCT Pub. Date: Apr. 11, 2024

(65) Prior Publication Data
US 2026/0135392 A1 May 14, 2026

(51) Int. Cl.
*H02J 3/48* (2026.01)
*G05F 1/67* (2006.01)
(Continued)

(52) U.S. Cl.
CPC .................. *H02J 3/48* (2013.01); *G05F 1/67* (2013.01); *H02J 3/16* (2013.01); *H02J 3/381* (2013.01); *H02S 40/32* (2014.12)

(58) Field of Classification Search
CPC ..... H02J 3/48; H02J 3/16; H02J 3/381; G05F 1/67; H02S 40/32
(Continued)

(56) References Cited

U.S. PATENT DOCUMENTS 12,381,398 B2 * 8/2025 Schweizer ................ H02J 3/38
2020/0409404 A1 * 12/2020 Knobloch ................ H02J 3/16

OTHER PUBLICATIONS

Bo Fang et al., "Current-Limiting Control of Grid-Forming Inverters: State-of-the-Art and Open Issues", TECHRXIV, Sep. 8, 2022, 10 pages.

(Continued)

*Primary Examiner* — Arnold M Kinkead
(74) *Attorney, Agent, or Firm* — PROCOPIO, CORY, HARGREAVES & SAVITCH LLP

(57) ABSTRACT

A method for grid forming control using a voltage source converter (VSC), connected to a grid at a point-of-common-coupling (PCC), is provided. The method comprises calculating a converter voltage reference for the VSC based at least on a reference current, calculating a phase-angle of an electromotive force (EMF) voltage vector of the VSC based on at least an active power reference, calculating a voltage amplitude of the EMF voltage vector based on at least a grid voltage at the PCC and a grid voltage reference, calculating the reference current by feeding the EMF voltage vector through a virtual admittance, and limiting the active power reference and the voltage amplitude based at least on a maximum allowed current threshold associated with operation of the VSC such that the reference current does not exceed said maximum allowed current threshold.

19 Claims, 9 Drawing Sheets

(51) Int. Cl.
*H02J 3/16* (2026.01)
*H02J 3/38* (2026.01)
*H02S 40/32* (2014.01)

(58) Field of Classification Search
USPC ....... 307/52, 19, 20, 21; 703/18, 13; 361/78, 361/79, 85, 86.87; 363/95
See application file for complete search history.

(56) References Cited

OTHER PUBLICATIONS

Kun Sun et al., "Dual-Loop PQ Control Scheme for Transient Stability Enhancement and Current Limitation of VSG", Powercon 2021, 2021 International Conference on Power System Technology, Dec. 8-9, 2021, 5 pages.

Mads Graungaard Taul et al., "Current Limiting Control With Enhanced Dynamics of Grid-Forming Converters During Fault Conditions", IEEE Journal of Emerging and Selected Topics in Power Electronics, vol. 8, No. 2, Jun. 2020.

Roberto Rosso et al., "Grid-Forming Converters: Control Approaches, Grid-Synchronization, and Future Trends—A Review", IEEE Open Journal of Industry Applications, 2021, 17 pages.

* cited by examiner

CONTROL SYSTEM CONFIGURED FOR, AND A METHOD FOR, EMULATING A VIRTUAL SYNCHRONOUS MACHINE OF A GRID-FORMING VOLTAGE SOURCE CONVERTER

CROSS-REFERENCE TO RELATED APPLICATIONS

The present application is a national stage entry of International Patent Application No. PCT/EP2022/077951, filed on Oct. 7, 2022, which is hereby incorporated herein by reference as if set forth in full.

TECHNICAL FIELD

The present disclosure relates to electric power systems, especially control of electric power systems.

BACKGROUND

Conventional synchronous generators provide power systems with important ancillary services, such as synchronizing and damping torque, high short-circuit currents and inertia, which are important for providing the ability to handle large disturbances in a power system, such as, for example, a short-circuit fault. The important ancillary services play a big part in why conventional synchronous generators are able to provide, so called, grid-forming capabilities.

Power systems and power generation are going through a shift due to the increasing penetration of renewable energy sources, such as photovoltaic panels and wind turbines. In parallel with the increase of renewable energy sources, the integration of power-electronic systems, such as Flexible Alternating Current Transmission Systems, FACTS, and High-Voltage, Direct Current, HVDC, systems, has increased. However, said power-electronic systems have not been able to provide the important ancillary services.

Therefore, there is a great interest in being able to use converters, for example, of FACTS- and/or HVDC-systems, in a power system to more reliably provide the important ancillary services.

SUMMARY

It is therefore an object of the present invention to provide a control system, and a method thereof, which allows for using converters to provide ancillary services.

There is a further object of providing the ability of grid forming control using converters.

According to a first aspect of the present disclosure, a control system is provided. The control system is configured for grid forming control using a voltage source converter (VSC) connected to a grid at a point-of-common-coupling (PCC). The control system comprises an alternate current (AC) controller configured to calculate a converter voltage reference for the VSC based at least on a reference current, an active-power controller configured to calculate a phase-angle of an electromotive force (EMF) voltage vector of the VSC based on at least an active power reference, and a voltage controller configured to calculate a voltage amplitude of the EMF voltage vector based on at least a grid voltage at the PCC and a grid voltage reference. The EMF voltage vector, comprising the phase-angle and the voltage amplitude, minus the grid voltage vector are multiplied by a virtual admittance to calculate the reference current. The control system further comprises a current limiter configured to prevent operation of the VSC above a maximum allowed current threshold, an active power reference limiter configured to limit the active power reference input to the active-power controller based at least on the maximum allowed current threshold, and a voltage limiter configured to limit the voltage amplitude output from the voltage controller based at least on the maximum allowed current threshold. The limitation of the active power reference and the limitation of the voltage amplitude prevent the reference current from exceeding the maximum allowed current threshold.

According to a second aspect of the present disclosure, a method for grid forming control using a VSC connected to a grid at a PCC is provided. The method comprises calculating a converter voltage reference for the VSC based at least on a reference current, calculating a phase-angle of an EMF voltage vector of the VSC based on at least an active power reference, and calculating a voltage amplitude of the EMF voltage vector based on at least a grid voltage at the PCC and a grid voltage reference. The method further comprises calculating the reference current by feeding the phase angle and the voltage of the EMF voltage vector through a virtual admittance, and limiting the active power reference and the voltage amplitude based at least on a maximum allowed current threshold associated with operation of the VSC such that the reference current does not exceed said maximum allowed current threshold.

There has been an interest in being able to implement a grid-forming converter, rather than a grid-following converter. A grid-forming converter should be able to behave as a controllable voltage source. However, how to handle limitation of the current of a grid-forming converter has been a big challenge, especially if the grid-forming properties of the converter is supposed to be maintained during unusual conditions in the grid to which it is connected. Several types of limitation methods, schemes, or strategies, have been proposed, spanning from hard limitation of a reference current sent to the current controller to manipulation of a virtual impedance and/or the voltage of the emulated machine. However, all limitation strategies mainly focus on the operation of the converter in case of voltage dips in the grid and typically require the activation of a phase-locked loop (PLL) to guarantee synchronization. A PLL may be necessary when inertia is to be provided by the converter (i.e. as an ancillary service) and the system is exposed to high rate of change of frequency (RoCoF).

The present disclosure is based on the concept of using limitation of the active power reference and/or the voltage amplitude to prevent the reference current from exceeding the maximum allowed current threshold (i.e. the reference current is reduced by the limitation of the active power reference and/or the voltage amplitude such that does not exceed the maximum allowed current threshold), thereby preserving the converter's grid forming capabilities. This further allows current exchanged between the converter and the grid to be maintained within the converter's limits without the current limiter having to prevent operation of the converter.

The active-power controller and the voltage controller may each be understood as being part of a respective outer control loop, while the AC controller may be understood as being part of an inner control loop. Thereby, the limitation of the active power reference and the limitation of the voltage amplitude is made at outer loops while the calculation of the converter voltage reference for the VSC is made in the inner loop.

The outer loop comprising the active-power controller may provide the converter with grid-forming properties similar to that of a synchronous machine and may form a relationship between power balance and internal frequency of the converter. Further, the outer loop comprising the active-power controller may be treated as a synchronization loop and may be kept relatively fast in order to provide dynamic performance and/or rejection of disturbances, such as, for example, phase-angle jumps. In other words, the outer loop comprising the active-power controller may provide synchronization which may in turn remove the need for a backup Phase-Locked Loop, PLL, configured for providing synchronization.

Further, the present disclosure is based on the concept of the abovementioned limitation being dynamic, in that the limitation by the active power reference limiter and/or the voltage limiter is based on non-static parameters. This allows the control system, and the method, to adapt to a grid with changing conditions, and also allows adjustments and tuning of the control system and method.

The active power reference may be the sum of an active power setpoint and an inertial active power reference. The control system may further comprise an inertial phase-locked loop, IPLL, unit configured to calculate the inertial active power reference based on the grid voltage at the PCC and the converter voltage reference. The converter voltage reference is thereby being fed back from the AC controller. The active power setpoint may be received by a system operator (i.e. a transmission system operator, TSO) or be predetermined. The implementation of both the IPLL and the active-power controller may provide decoupling of the inertia provision from the power-synchronization. Therefore, a PLL may not be needed for the power-synchronization.

The IPLL may be configured to calculate the inertial active power reference as a function of a calculated grid frequency derivative and/or a desired inertia time constant. The grid frequency derivative may be calculated by monitoring the grid frequency at the PCC and calculating the derivative of the monitored grid frequency.

The desired inertia time constant may be predetermined or received by a system operator. Thereby a resulting amount of active power and/or energy to be supplied by the converter to the grid may be predetermined or received by the system operator.

The IPLL may further comprise an anti-windup function. Accordingly, excess overshooting of the output of the IPLL may be avoided or reduced.

The AC controller may be configured to calculate the converter voltage reference for the VSC based on the reference current, a grid voltage at the PCC and a grid current at the PCC. In other words, the AC controller may have, at least, the reference current, a grid voltage at the PCC and a grid current at the PCC as inputs.

The active power reference limiter may be configured to limit the active power reference input to the active-power controller based on the maximum allowed current threshold, the grid voltage at the PCC and/or reactive power at the PCC. In other words, the active power reference limiter may have the maximum allowed current threshold, the grid voltage at the PCC and/or reactive power at the PCC as inputs.

The active power reference limiter may be configured to limit the active power reference input to the active-power controller below an active power threshold which is calculated according to the following equation:

$$P_{lim} = \sqrt{(|v_g|I_{lim})^2 - Q_g^2}$$

Thus, the active power threshold may be equal to the square root of the square of the absolute value of the grid voltage at the PCC times the maximum allowed current threshold minus the square of the reactive power at the PCC.

The active power reference limiter may be further configured to limit the active power reference input to the active-power controller based on grid codes from system operator. Furthermore, the active power reference limiter may be further configured to limit the active power reference based on active power and/or reactive power at the PCC, thereby avoiding a potential system collapse which may occur in case of, for example, very weak grid operations. The active power and reactive power at the PCC may be understood as being measured at the PCC.

The grid voltage reference and/or an active power setpoint may be received from a system operator.

The grid voltage reference, before being input to the voltage controller, may be subtracted by an output of a droop function having the reactive power at the PCC as an input. The reactive power at the PCC may be measured and/or received. Thus, the droop may be provided, thereby increasing the stability of the converter and, consequently, within the grid.

The voltage controller may be further configured to calculate the voltage amplitude of the EMF voltage vector by subtracting the grid voltage reference by the grid voltage, by integrating the subtracted grid voltage reference, and by adding a rated system voltage to the integrated and subtracted grid voltage reference. The rated system voltage may be predetermined and constant.

A difference between the voltage amplitude of the voltage controller and the voltage amplitude output from a voltage limiter may be multiplied by a feedback gain and subtracted from the grid voltage reference input to the voltage controller. A voltage limit calculated by the voltage limiter to limit the voltage amplitude output from the voltage controller may be calculated by summing the grid voltage at the PCC and a voltage drop across a virtual impedance. The virtual impedance may be equal to the inverse of the virtual admittance. The voltage drop across the virtual impedance may be calculated by the EMF voltage vector, comprising the phase-angle and the voltage amplitude, minus the grid voltage vector being multiplied by the virtual admittance. Consequently, the voltage drop across the virtual impedance may be calculated by the EMF voltage vector, comprising the phase-angle and the voltage amplitude, minus the grid voltage vector being divided by the virtual impedance.

The voltage limit calculated by the voltage limiter to limit the voltage amplitude output from the voltage controller may be calculated according to the following equation:

$$V_{lim} = V_g + \frac{P_{g,ref} - Q_{max}}{conj(V_g)}(R_V + jX_V)$$

$Q_{max}$ may be a maximum amount of available reactive power and $(R_V+jX_V)$ may be a virtual impedance which is equal to the inverse of the virtual admittance. Thus, the voltage limit may be equal to the sum of the grid voltage at the PCC, and the active power reference minus the maximum amount of available reactive power, divided by the conjugate of the grid voltage at the PCC, times the virtual impedance. The maximum amount of available reactive power may be determined based on an allowed apparent power and the active power reference. The relationship between the allowed apparent power and the maximum amount of available active and reactive power may be as follows:

$$S^2 = Q_{max}^2 + P_{max}^2$$

Further, the allowed apparent power may be calculated by the following equation:

$$S = V_g * I_{lim}$$

In accordance with the above, the maximum amount of available reactive power may be calculated according to:

$$Q_{max} = \sqrt{(V_g * I_{lim})^2 - P_{g,ref} * P_{g,ref}}$$

The current limiter may be configured for current limitation so as to at least partly preserve an angle of the reference current in accordance with a geometrical shape. For example, the current limiter may be configured for circular current limitation, such that the angle of the reference current is preserved if the current limiter is operated to limit the reference. However, the geometrical shape is not limited to being circular and may be, for example, elliptical, square, or hexagonal, or any geometrical shape.

The maximum allowed current threshold may be based on at least one of: an ambient temperature at the VSC, a safe operating area, SOA, of the VSC, and a temperature of semiconductors of the VSC.

The method according to the second aspect of the present disclosure may further comprise preventing operation of the VSC above the maximum allowed current threshold if the reference current is above the maximum allowed current threshold.

It is noted that other embodiments using all possible combinations of features recited in the above-described embodiments, alternatives or examples, may be envisaged. Thus, the present disclosure also relates to all possible combinations of features mentioned herein.

BRIEF DESCRIPTION OF DRAWINGS

Exemplifying embodiments will now be described in more detail, with reference to the following appended drawings.

As illustrated in the figures, the sizes of elements and region may be exaggerated for illustrative purposes and, thus, are provided to illustrate the general structures of the embodiments. Like reference numerals refer to like elements throughout.

DETAILED DESCRIPTION

Exemplifying embodiments will now be described more fully hereinafter with reference to the accompanying drawings in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

Figure 1:
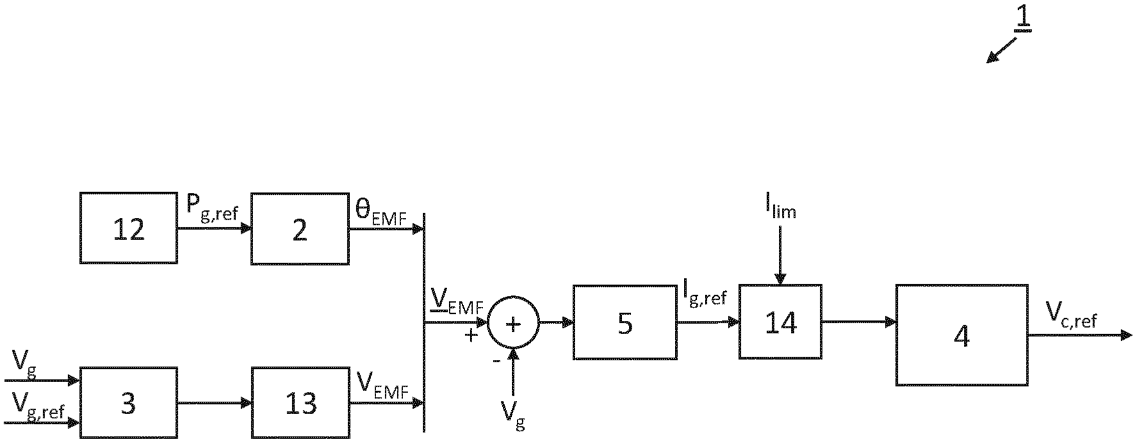
FIG. 1 illustrates a control system according to an exemplifying embodiment of the present disclosure.

FIG. 1 illustrates a control system 1 according to an exemplifying embodiment of the present disclosure. The control system 1 is configured to provide grid forming control using a voltage source converter (VSC) (not shown, see e.g. FIG. 8) which is connected to a grid at a point-of-common-coupling (PCC, not shown, see e.g. FIG. 8). The control system 1 comprises an alternate current, AC, controller 4 configured to calculate a converter voltage reference $V_{c,ref}$ for the VSC based at least on a reference current $I_{g,ref}$. The control system 1 may be understood as providing control of the VSC by calculating the converter voltage reference $V_{c,ref}$. The reference current $I_{g,ref}$ is calculated by subtracting an electromotive force, EMF, voltage vector $\underline{V}_{EMF}$ of the VSC by a grid voltage $V_g$ at the PCC and by multiplying the subtracted result with a virtual admittance 5. The control system 1 further comprises a current limiter 14 configured to prevent operation of the VSC above a maximum allowed current threshold $l_{lim}$. Thus, the current limiter 14 may limit the reference current $I_{g,ref}$ input to the AC controller 4 if the reference current $I_{g,ref}$ is above the maximum allowed current threshold $l_{lim}$. However, during normal operation of the control system, the reference current $I_{g,ref}$ is kept below the maximum allowed current threshold $l_{lim}$ and the current limiter 14 may limit the reference current $I_{g,ref}$ as a security precaution or as a last resort in case of extreme conditions, such as, for example, a fault in the grid or a failure in the converter.

The control system 1 further comprises an active-power controller 2, which is configured to calculate a phase-angle $\theta_{EMF}$ of the electromotive force, EMF, voltage vector based on at least an active power reference $P_{g,ref}$. The control system 1 further comprises an active power reference limiter 12 configured to limit the active power reference $P_{g,ref}$ input to the active-power controller 2.

The control system 1 comprises a voltage controller 3 configured to calculate a voltage amplitude $V_{EMF}$ of the EMF voltage vector based on at least a grid voltage $V_g$ at the PCC and a grid voltage reference $V_{g,ref}$. The control system 1 further comprises a voltage limiter 13 configured to limit the voltage amplitude $V_{EMF}$ output from the voltage controller 3 based at least on the maximum allowed current threshold $l_{lim}$. The control system 1 is configured to use the active power reference limiter 12 to limit the active power reference $P_{g,ref}$ input to the active-power controller 2 and/or the voltage limiter 13 to limit the voltage amplitude $V_{EMF}$ output from the voltage controller 3 in order to not activate, or trigger, the current limiter 14 since the reference current is kept below the maximum allowed current threshold $l_{lim}$. The control system 1 may be understood as comprising two outer control loops comprising the active-power controller 2 and the voltage controller 3, respectively, and an inner control loop comprising the AC controller 4.

The EMF voltage vector $\underline{V}_{EMF}$ may be understood as being formed by the phase-angle $\theta_{EMF}$ and the voltage amplitude $V_{EMF}$ calculated by the active-power controller 2 and the voltage controller 3, respectively. Thus, the EMF voltage vector $\underline{V}_{EMF}$ may be understood as being calculated by the outer control loops and used by the AC controller 4 in the inner control loop.

Further, the control system 1 is configured to perform limitation in the outer control loops (i.e. by using the active power reference limiter 12 and/or the voltage limiter 13) rather than in the inner control loop. The limitation in the outer control loops may cause the reference current $I_{g,ref}$ to be reduced, but reduction, rather than limitation of the reference current $I_{g,ref}$, may allow the control system to maintain grid forming capabilities during such a reduction.

Figure 2:
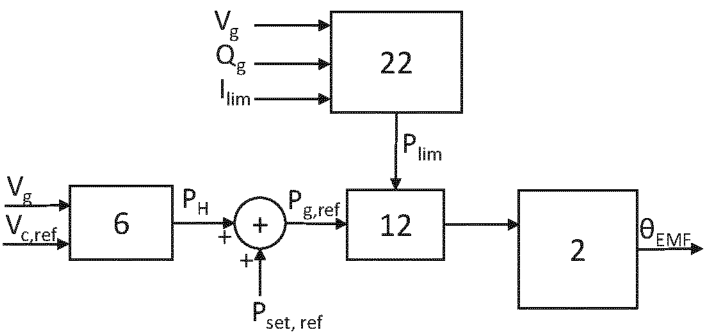
FIG. 2 illustrate a portion of a control system according to an exemplifying embodiment of the present disclosure.

FIG. 2 illustrates a portion of a control system according to exemplifying embodiments of the present disclosure.

The portion of the control system shown in FIG. 2 comprises an active-power controller 2, an active power reference limiter 12 and an inertial phase-locked loop, IPLL, unit 6. The portion of the control system shown in FIG. 2 may be, for example, a portion of the control system 1 shown in FIG. 1, wherein the active-power controller 2 and the active power reference limiter 12 may be similar or substantially identical.

The active-power controller 2 is configured to calculate a phase-angle $\theta_{EMF}$ of an EMF based on at least an active power reference $P_{g,ref}$. The active power reference $P_{g,ref}$ is received by the active-power controller, via the active power reference limiter 12, which is configured to limit the active power reference $P_{g,ref}$. The portion of the control system further shows an active power threshold unit 22. The active power threshold unit 22 is configured to calculate an active power threshold $P_{lim}$, below which the active-power controller 2 may be configured to limit the active power reference $P_{g,ref}$. The inputs to the active power threshold unit 22 are shown to be the maximum allowed current threshold $l_{lim}$, the grid voltage at the PCC $V_g$, and reactive power at the PCC. However, the control system is not limited to comprising the active power threshold unit 22 as shown in FIG. 2. For example, the active power threshold unit 22 and the active power reference limiter 12 may be integrated in a single entity. For instance, the active power threshold unit 22 may be a part of the active power reference limiter 12. Further, it should be understood that the active power threshold unit 22 (or the active power reference limiter 12 comprising the active power threshold unit 22) is not limited to receiving only the abovementioned inputs.

The active power reference $P_{g,ref}$ input to the active power reference limiter 12 is the sum of an active power setpoint $P_{set,ref}$ and an inertial active power reference $P_H$. The active power setpoint $P_{set,ref}$ may be determined by, and/or received from, a system operator. The inertial active power reference $P_H$ is output from the IPLL unit 6 which may be configured to calculate the inertial active power reference $P_H$ based on the grid voltage $V_g$ at the PCC and the converter voltage reference $V_{c,ref}$.

Figure 3:
FIG. 3 illustrates an active-power controller of a control system according to an exemplifying embodiment of the present disclosure.
Figure 3:
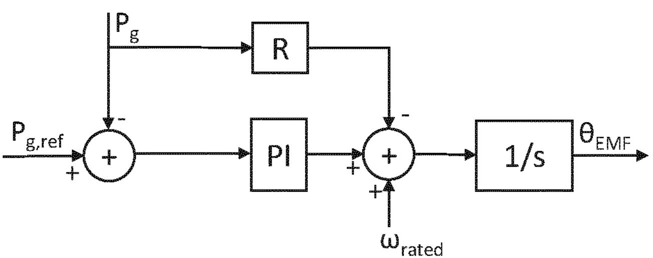

FIG. 3 illustrates an active-power controller 2 of a control system according to an exemplifying embodiment of the present disclosure.

The active-power controller 2 may, for example, be the active-power controller of the portion of a control system shown in FIG. 2, and/or of the control system shown in FIG. 1, and the active-power controllers shown in FIGS. 1 and 2 may be similar or substantially identical to the one shown in FIG. 3.

The exemplifying embodiment of the active-power controller 2 shown in FIG. 3 comprises a PI-regulator.

The active power reference $P_{g,ref}$ output from the active power reference limiter (not shown; see e.g. FIGS. 1 and 2) is subtracted by the active power at the PCC $P_g$ and input to the PI-regulator.

The output of the PI-regulator is added by a rated grid frequency $\omega_{rated}$ and subtracted by the active power at the PCC $P_g$ which has been multiplied by an active damping factor $\hat{R}$. The result is then integrated to acquire the phase-angle $\theta_{EMF}$. The rated grid frequency $\omega_{rated}$ may be predetermined and constant.

It is to be understood that the present disclosure is not limited to an active-power controller 2 as shown in FIG. 3 and discussed in the above. For example, the active-power controller 2 may have additional, or fewer, or a different combination of inputs and/or a different structure.

Figure 4:
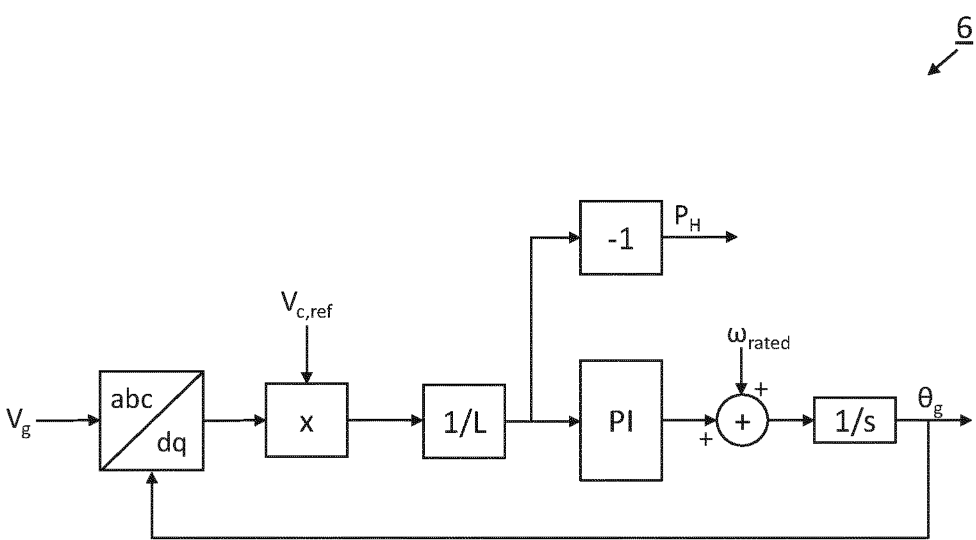
FIG. 4 illustrates an inertial PLL of a control system according to an exemplifying embodiment of the present disclosure.

FIG. 4 illustrates an inertial PLL, IPLL, 6 of a control system according to an exemplifying embodiment of the present disclosure.

The IPLL 6 may, for example, be the IPLL shown in FIG. 2, and the IPLL shown in FIG. 2 may be similar or substantially identical to the one shown in FIG. 4.

The IPLL 6 comprises a Park transformation block (indicated in FIG. 4 by a block comprising the text "abc/dq"). The Park transformation block is configured for transforming the received three-phase ("abc") signals $V_g$, i.e. the grid voltage at the PCC, and the phase-angle of the grid at the PCC $\theta_g$ to a rotating reference frame. The output of the Park transformation block is multiplied by the converter voltage reference $V_{c,ref}$ (indicated in FIG. 4 as a block comprising an "x"), which is received from an AC controller of the control system (not shown; see e.g. FIG. 1). The multiplied result is then divided by a filter reactance L. The divided result is input to the PI-regulator, and is also inverted, wherein the inverted result becomes the inertial active power reference $P_H$.

The output from the PI-regulator is added by a rated grid frequency $\omega_{rated}$ and is then integrated, thereby calculating the phase-angle of the grid at the PCC Og, which is also fed back to the Park transformation block.

Figure 5:
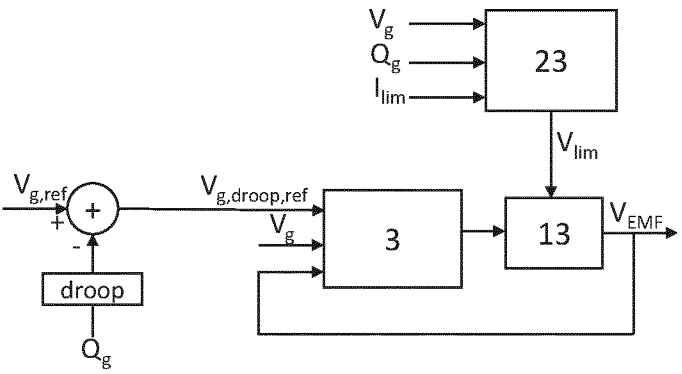
FIG. 5 illustrates a portion of a control system according to an exemplifying embodiment of the present disclosure.

FIG. 5 illustrates a portion of a control system 1 according to an exemplifying embodiment of the present disclosure.

The portion of the control system shown in FIG. 5 comprises a voltage controller 3 and a voltage limiter 13. The portion of the control system shown in FIG. 5 may be, for example, a portion of the control system 1 shown in FIG. 1, wherein the voltage controller 3 and the voltage limiter 13 may be similar or substantially identical.

The voltage controller 3 is configured to calculate a voltage amplitude $V_{EMF}$ of the EMF voltage vector. One of the inputs to the voltage controller 3 is a grid voltage reference $V_{g,ref}$ which is subtracted by a reactive power $Q_g$ at the PCC, wherein the reactive power Og at the PCC has been put through a droop function, and the input is here referenced to as the droop grid voltage reference $V_{g,droop,ref}$ for the sake of clarity. However, it is to be understood that the present disclosure is not limited to the use of a droop function as shown in FIG. 5, and that the grid voltage reference $V_{g,ref}$ may be input directly to the voltage controller 3. Another one of the inputs to the voltage controller 3 is the grid voltage $V_g$ at the PCC. Yet another input to the voltage controller 3 is the output from the voltage limiter 13 which is fed back to the voltage controller 3.

The portion of the control system depicted in FIG. 5 shows a voltage limit unit 23. The voltage limit unit 23 is configured to calculate the voltage limit $V_{lim}$, which is used by the voltage limiter 13 as a threshold for the output from the voltage controller 3. The calculation of the voltage limit $V_{lim}$ may be based on the grid voltage $V_g$ at the PCC, the reactive power $Q_g$ at the PCC, and the maximum allowed current threshold $I_{lim}$.

However, the control system 1 is not limited to comprising the voltage limit unit 23 as shown in FIG. 5. For example, the voltage limit unit 23 and the voltage limiter 13 may be integrated in a single entity. For instance, the voltage limit unit 23 may be part of the voltage limiter 13. Further, it should be understood that the voltage limit unit 23 (or the voltage limiter 13 comprising the voltage limit unit 23) is not limited to receiving the abovementioned inputs.

Figure 6:
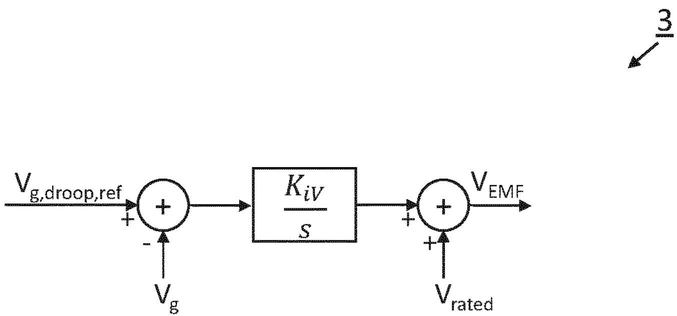
FIGS. 6 and 7 illustrate voltage controllers of a control system according to exemplifying embodiments of the present disclosure.

FIG. 6 illustrates a voltage controller 3 of a control system according to an exemplifying embodiment of the present disclosure.

The voltage controller 3 may, for example, be the voltage controllers shown in FIGS. 1 and 5 may be similar or substantially identical to the one shown in FIG. 6. The inputs to the voltage controller 3 shown in FIG. 6 includes the droop grid voltage reference $V_{g,droop,\ ref}$, the grid voltage $V_g$ at the PCC, and a rated system voltage $V_{rated}$. The droop grid voltage reference $V_{g,droop,ref}$ is subtracted by the grid voltage $V_g$ at the PCC, and the result is multiplied by the parameter Kiv and integrated. The integrated result is added to the rated system voltage $V_{rated}$, thereby calculating a voltage amplitude $V_{EMF}$ of the EMF voltage vector.

It is to be understood that the grid voltage reference $V_{g,ref}$, rather than the droop grid voltage reference $V_{g,droop,\ ref}$, may be input directly to the voltage controller 3, as previously discussed with regards to FIG. 5

Figure 7:
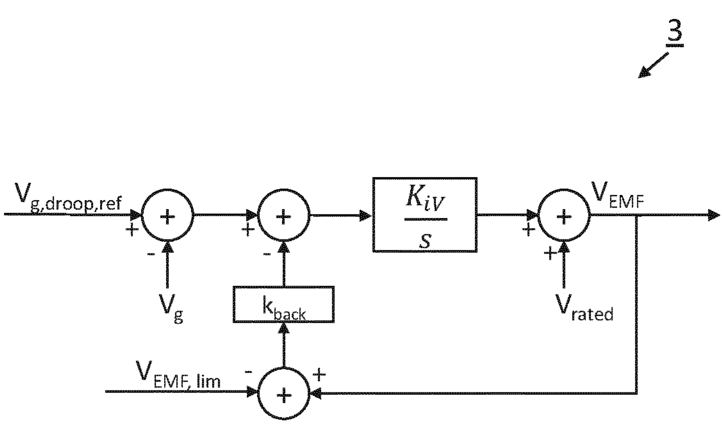

FIG. 7 illustrates a voltage controller 3 of the control system according to exemplifying embodiments of the present disclosure.

The voltage controller 3 shown in FIG. 7 may be similar to the voltage controller shown in FIG. 6. Therefore, reference is also made to FIG. 6 and the text relating thereto for describing the voltage controller 3 of FIG. 7.

A difference between the voltage controller 3 shown in FIG. 7 and the voltage controller as shown in FIG. 6 is that the voltage controller 3 shown in FIG. 7 uses a feedback loop. The feedback loop involves calculating a difference between the voltage amplitude $V_{EMF}$ of the EMF voltage vector, which is calculated by the voltage controller 3, and a limited voltage amplitude $V_{EMF,lim}$ of the EMF voltage vector, which has been limited by a voltage limiter (not shown; see e.g. FIG. 1 or FIG. 5), and then multiplying the difference with a feedback gain $k_{back}$, and the multiplied result is then subtracted from the droop grid voltage reference $V_{g,droop,\ ref}$. Consequently, if the voltage amplitude $V_{EMF}$ output from the voltage controller 3 is below a voltage limit $V_{lim}$ of the voltage limiter, the output from the voltage controller 3 and the voltage limiter is the same, and thereby the difference is zero. This feedback of the difference may prevent windup of the integrating portion of the voltage controller 3. Alternatively to the feedback, the voltage controller 3 may comprise back calculation in order to prevent windup of the integrating portion.

Figure 8:
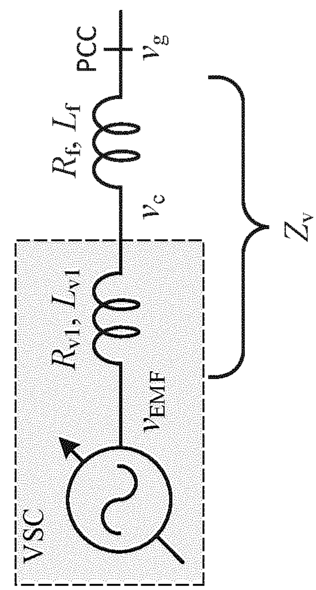
FIG. 8 illustrates a voltage source converter connected to a grid according to an exemplifying embodiment of the present disclosure.

FIG. 8 illustrates a voltage source converter (VSC) connected to a grid according to an exemplifying embodiment of the present disclosure.

The VSC is indicated as a dashed box which is connected to a (electrical power) grid via a filter impedance, $R_f$, $L_f$. The output from the VSC is the converter voltage $V_c$, which is then fed through the filter impedance, $R_f$, $L_f$ before reaching the PCC. Further, the VSC may be modelled as a voltage source which outputs an electromotive force, EMF, voltage vector $V_{EMF}$ and a VSC virtual impedance $R_{v1}$, $L_{v1}$ connected in series. The filter impedance, $R_f$, $L_f$ and VSC virtual impedance $R_{v1}$, $L_{v1}$ the together form a virtual impedance $Z_v$. The virtual impedance Zv is the inverse of the virtual admittance (as shown in FIG. 1 and discussed in the text relating thereto). It is to be noted that the role of the virtual impedance is not to emulate the electric characteristics of a synchronous generator, but rather to serve as a connection between $V_{EMF}$ and $V_g$ in order to be able to calculate the converter voltage reference.

Figure 9:
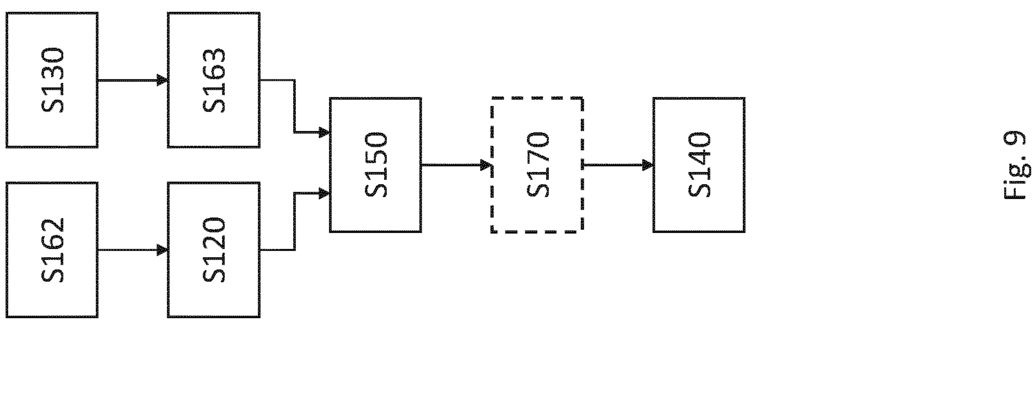
FIG. 9 illustrates a flow chart according to an exemplifying embodiment of the present disclosure.

FIG. 9 illustrates a flow chart of a method 100 according to an exemplifying embodiment of the present disclosure.

The method 100 is for forming control using a voltage source converter, VSC, connected to a grid at a point-of-common-coupling, PCC. The method 100 comprises calculating S140 a converter voltage reference for the VSC based at least on a reference current, calculating S120 a phase-angle of an electromotive force, EMF, voltage vector of the VSC based on at least an active power reference, calculating S130 a voltage amplitude of the EMF voltage vector based on at least a grid voltage at the PCC and a grid voltage reference, calculating S150 the reference current by feeding the phase angle and the voltage of the EMF voltage vector through a virtual admittance, and limiting S162 the active power reference and/or limiting S163 the voltage amplitude based at least on a maximum allowed current threshold associated with operation of the VSC such that the reference current does not exceed said maximum allowed current threshold.

The method 100 may comprise the step of preventing S170 operation of the VSC above said maximum allowed current threshold if the reference current is above said maximum allowed current threshold.

The method 100 provides an improved way of making sure that the reference current is kept below a maximum allowed current threshold without having to use "hard" current limitation. In other words, the method 100 provides a dynamic limitation of the active power reference and/or the voltage amplitude, in order to prevent the reference current from reaching the maximum allowed current threshold.

The invention has mainly been described above with reference to a few embodiments. However, as is readily appreciated by a person skilled in the art, other embodiments than the ones disclosed above are equally possible within the scope of the invention, as defined by the appended patent claims. Further, although features and elements are described above in particular combinations, each features or element can be used alone without the other features and elements or in various combinations with or without other features and elements.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A control system configured for grid forming control using a voltage source converter (VSC) connected to a grid at a point-of-common-coupling (PCC), the control system comprising:

an alternate current (AC) controller configured to calculate a converter voltage reference ($V_{c,ref}$) for the VSC based at least on a reference current ($I_{g,ref}$);

an active-power controller configured to calculate a phase-angle ($\theta_{EMF}$) of an electromotive force (EMF) voltage vector ($V_{EMF}$) of the VSC based on at least an active power reference ($P_{g,ref}$); and a voltage controller configured to calculate a voltage amplitude ($V_{EMF}$) of the EMF voltage vector ($V_{EMF}$) based on at least a grid voltage ($V_g$) at the PCC and a grid voltage reference ($V_{g,ref}$);

wherein the EMF voltage vector ($V_{EMF}$), comprising the phase-angle ($\theta_{EMF}$) and the voltage amplitude ($V_{EMF}$), minus the grid voltage ($V_g$) are multiplied by a virtual admittance to calculate the reference current ($I_{g,ref}$), said control system further comprising:

a current limiter configured to prevent operation of the VSC above a maximum allowed current threshold ($l_{lim}$);

an active power reference limiter configured to limit the active power reference ($P_{g,ref}$) input to the active-power controller based at least on the maximum allowed current threshold ($l_{lim}$); and a voltage limiter configured to limit the voltage amplitude ($V_{EMF}$) output from the voltage controller based at least on the maximum allowed current threshold ($l_{lim}$);

wherein the limitation of the active power reference ($P_{g,ref}$) and the limitation of the voltage amplitude ($V_{EMF}$) prevent the reference current ($I_{g,ref}$) from exceeding the maximum allowed current threshold ($I_{lim}$);

wherein the active power reference ($P_{g,ref}$) is a sum of an active power setpoint ($P_{set,ref}$) and an inertial active power reference ($P_H$); and wherein the control system further comprises an inertial phase-locked loop (IPLL) unit configured to calculate the inertial active power reference ($P_H$) based on the grid voltage ($V_g$) at the PCC and the converter voltage reference ($V_{c,ref}$).

2. The control system according to claim 1, wherein the IPLL is configured to calculate the inertial active power reference ($P_H$) as a function of a calculated grid frequency derivative and a desired inertia time constant.

3. The control system according to claim 1, wherein the IPLL further comprises an anti-windup function.

4. The control system according to claim 1, wherein the AC controller is configured to calculate the converter voltage reference ($V_{c,ref}$) for the VSC based on the reference current ($I_{g,ref}$), a grid voltage ($V_g$) at the PCC, and a grid current ($I_g$) at the PCC.

5. The control system according to claim 1, wherein the active power reference limiter is configured to limit the active power reference ($P_{g,ref}$) input to the active-power controller based on the maximum allowed current threshold ($l_{lim}$), the grid voltage ($V_g$) at the PCC, and/or reactive power ($Q_g$) at the PCC.

6. The control system according to claim 5, wherein the active power reference limiter is configured to limit the active power reference ($P_{g,ref}$) input to the active-power controller below an active power threshold ($P_{lim}$) which is calculated according to:

$$P_{lim} = \sqrt{(|v_g|I_{lim})^2 - Q_g^2}\,.$$

7. The control system according to claim 1, wherein the active power reference limiter is further configured to limit the active power reference ($P_{g,ref}$) input to the active-power controller based on grid codes received from a system operator and/or active power and/or reactive power ($Q_g$) at the PCC.

8. The control system according to claim 1, wherein the grid voltage reference ($V_{g,ref}$) and/or an active power setpoint ($P_{set,ref}$) are received from a system operator.

9. The control system according to claim 1, wherein the grid voltage reference ($V_{g,ref}$), before being input to the voltage controller, is subtracted by an output of a droop function having the reactive power ($Q_g$) at the PCC as an input.

10. The control system according to claim 1, wherein the voltage controller is further configured to calculate the voltage amplitude ($V_{EMF}$) of the EMF voltage vector by subtracting the grid voltage reference ($V_{g,ref}$) by the grid voltage ($V_g$), by integrating the subtracted grid voltage reference ($V_{g,ref}$), and by adding a rated system voltage ($V_{rated}$) to the integrated and subtracted grid voltage reference ($V_{g,ref}$).

11. The control system according to claim 1, wherein a difference between the voltage amplitude ($V_{EMF}$) of the voltage controller and the voltage amplitude ($V_{EMF}$) output from a voltage limiter is multiplied by a feedback gain ($k_{back}$) and subtracted from the grid voltage reference ($V_{g,ref}$) input to the voltage controller.

12. The control system according to claim 1, wherein a voltage limit ($V_{lim}$) calculated by the voltage limiter to limit the voltage amplitude ($V_{EMF}$) output from the voltage controller is calculated by summing the grid voltage ($V_g$) at the PCC and a voltage drop across a virtual impedance, wherein the virtual impedance is equal to the inverse of the virtual admittance, and wherein the voltage drop across the virtual impedance is calculated by the EMF voltage vector ($V_{EMF}$), comprising the phase-angle ($\theta_{EMF}$) and the voltage amplitude ($V_{EMF}$), minus the grid voltage vector ($V_g$) being multiplied by the virtual admittance.

13. The control system according to claim 11, wherein a voltage limit ($V_{lim}$) calculated by the voltage limiter to limit the voltage amplitude ($V_{EMF}$) output from the voltage controller is calculated according to:

$$V_{lim} = V_g + \frac{P_{g,ref} - Q_{max}}{conj(V_g)}(R_V + jX_V)$$

wherein $Q_{max}$ is a maximum amount of available reactive power and ($R_V$+j$X_V$) is a virtual impedance which is equal to the inverse of the virtual admittance.

14. The control system according to claim 13, wherein the maximum amount of available reactive power ($Q_{max}$) is determined based on an allowed apparent power and the active power reference ($P_{g,ref}$).

15. The control system according to claim 13, wherein the maximum amount of available reactive power ($Q_{max}$) is calculated according to:

$$Q_{max} = \sqrt{(V_g * I_{lim})^2 - P_{g,ref} * P_{g,ref}}.$$

16. The control system according to claim 1, wherein the current limiter is configured for current limitation so as to at least partly preserve an angle of the reference current ($I_{g,ref}$) in accordance with a geometrical shape.

17. The control system according to claim 1, wherein the maximum allowed current threshold ($l_{lim}$) is based on at least one of: an ambient temperature at the VSC, a safe operating area (SOA) of the VSC, or a temperature of semiconductors of the VSC.

18. A method for grid forming control using a voltage source converter (VSC) connected to a grid at a point-of-common-coupling (PCC), the method comprising:

calculating a converter voltage reference ($V_{c,ref}$) for the VSC based at least on a reference current ($I_{g,ref}$);

calculating a phase-angle ($\theta_{EMF}$) of an electromotive force (EMF) voltage vector of the VSC based on at least an active power reference ($P_{g,ref}$);

calculating a voltage amplitude ($V_{EMF}$) of the EMF voltage vector based on at least a grid voltage ($V_g$) at the PCC and a grid voltage reference ($V_{g,ref}$);

calculating the reference current ($I_{g,ref}$) by feeding the phase angle ($\theta_{EMF}$) and the voltage ($V_{EMF}$) of the EMF voltage vector through a virtual admittance; and limiting the active power reference ($P_{g,ref}$) and the voltage amplitude ($V_{EMF}$) based at least on a maximum allowed current threshold ($l_{lim}$) associated with operation of the VSC such that the reference current ($I_{g,ref}$) does not exceed said maximum allowed current threshold ($I_{lim}$);

wherein the active power reference ($P_{g,ref}$) is a sum of an active power setpoint ($P_{set,ref}$) and an inertial active power reference ($P_H$); and wherein the method further comprises calculating the inertial active power reference ($P_H$) based on the grid voltage (Ve) at the PCC and the converter voltage reference ($V_{c,ref}$).

19. The method of claim 18, further comprising preventing operation of the VSC above said maximum allowed current threshold if the reference current ($I_{g,ref}$) is above said maximum allowed current threshold.

* * * * *